United States Patent [19]

McColl

[11] Patent Number: 5,118,543
[45] Date of Patent: Jun. 2, 1992

[54] STRUCTURED GLASS, AND AN IMPROVED INSULATING GLASS ASSEMBLY

[76] Inventor: William D. McColl, 2429 Spruce St., Bellingham, Wash. 98225

[21] Appl. No.: 430,489

[22] Filed: Nov. 1, 1989

[51] Int. Cl.⁵ .......................... E06B 3/24; E04B 7/18
[52] U.S. Cl. ..................................... 428/34; 428/155;
428/167; 428/172; 428/174; 428/192; 428/410;
428/426; 52/200; 52/788; 52/790; 52/795;
65/106; 65/287
[58] Field of Search ................. 428/174, 182, 426, 34,
428/156, 192, 410, 141, 155, 167, 172, 195, 332;
156/107, 109; 52/200, 630, 796, 788, 201, 795,
801, 814, 790; 65/106, 287, 44, 273, 107, 275

[56] References Cited

U.S. PATENT DOCUMENTS

| | | | |
|---|---|---|---|
| 497,574 | 5/1893 | Heckert | 49/84 |
| 642,196 | 1/1900 | Belcher | 428/174 |
| 643,223 | 2/1900 | Dhé et al. | 49/84 |
| 1,146,910 | 7/1915 | Wiley et al. | 49/84 |
| 1,236,938 | 8/1917 | Hough | 49/84 |
| 2,024,775 | 12/1935 | Mattman | 49/84 |
| 2,057,763 | 10/1936 | Boyles et al. | 49/84 |
| 2,261,023 | 10/1941 | Galey | 49/67 |
| 4,184,480 | 1/1980 | Kenny | 52/200 |
| 4,186,723 | 2/1980 | Coppola et al. | 126/443 |
| 4,210,435 | 7/1980 | Claassen | 65/106 |

FOREIGN PATENT DOCUMENTS

| | | | |
|---|---|---|---|
| 670401 | 9/1963 | Canada | 108/32 |
| 1013602 | 4/1983 | China | 52/200 |
| 1445128 | 8/1976 | United Kingdom | 52/200 |

*Primary Examiner*—Ellis P. Robinson
*Assistant Examiner*—Donald J. Loney
*Attorney, Agent, or Firm*—Seed and Berry

[57] ABSTRACT

An improved insulating glass assembly incorporates an articulated low relief structured glass sheet as one or both external faces of the assembly. The low relief structured glass sheet is composed of a formation of external convex curvatures and a corresponding array of internal concavities, defined and separated by a plurality of imparted graphic lines and a corresponding plurality of internal retaining ridges. Unique optical effects are intrinsic to the structured glass sheet. The disclosure includes the mold apparatus for manufacturing low relief structured glass sheets.

10 Claims, 3 Drawing Sheets

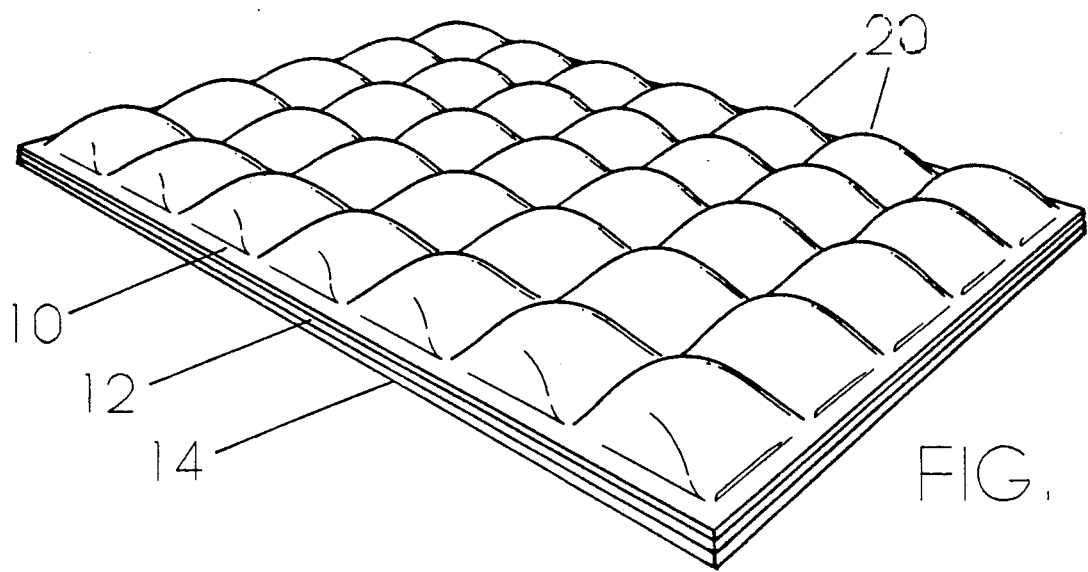
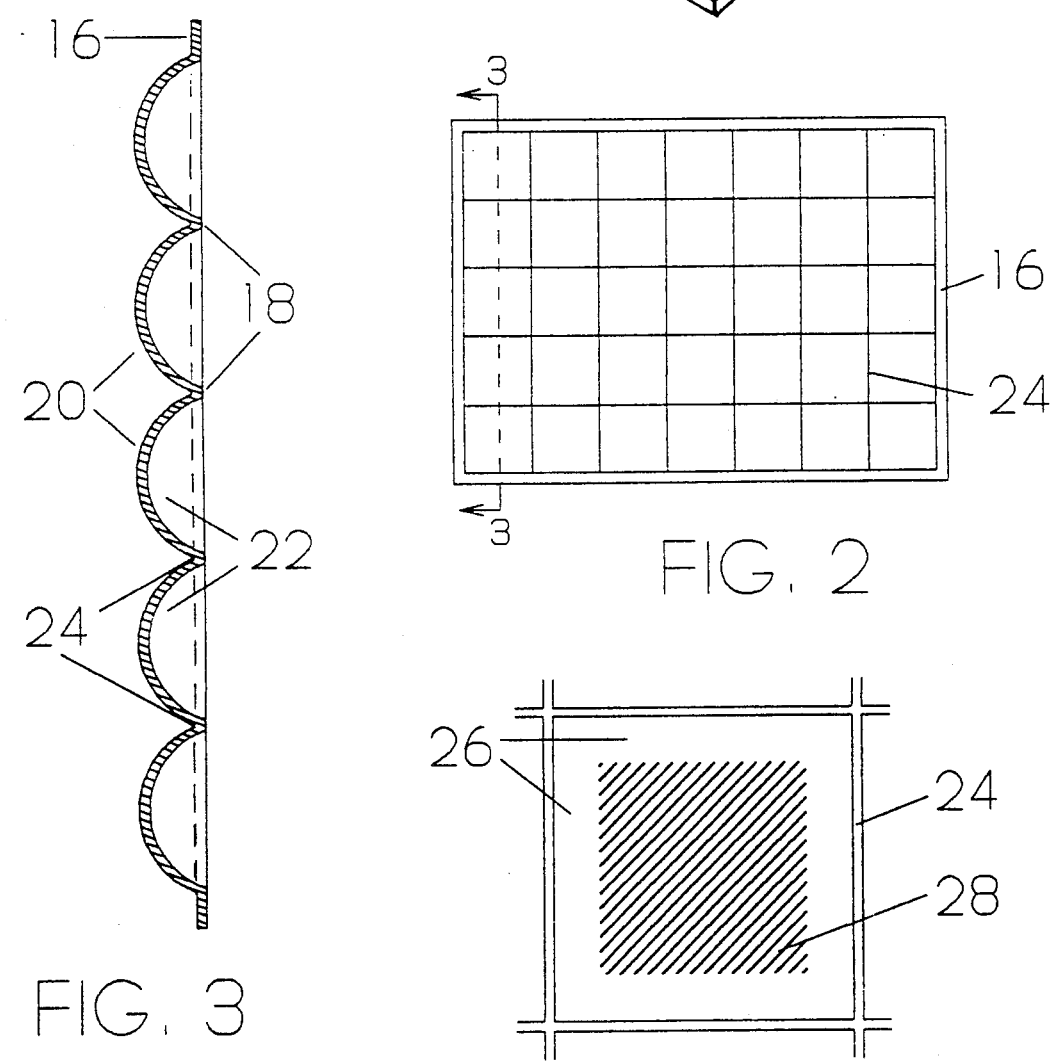

STRUCTURED GLASS, AND AN IMPROVED INSULATING GLASS ASSEMBLY

BACKGROUND OF THE INVENTION

1. Field of the invention

This invention relates in general to formed glass manufacture, and in particular to an improved insulating glass assembly for architectural applications.

2. Description of the Prior Art

The demands of architecture often require specialty glass treatments for window, door, and wall areas. Often, these specialty requirements have been met by various assemblages of glass, as exemplified by leaded glass, glass block, and small paned windows. These assemblages have the disadvantage of multiple perimeters which increase susceptibility to air and moisture leakage and may adversely affect thermal performance. Assemblages also require higher material costs, higher initial labor costs, and higher maintenance costs, as compared to a single sheet of glass of the same area.

However, these assemblages do perform valued functions within an architectural context. Division of glazed areas into smaller units is thought to provide human scale and to increase the protective and comforting sense of enclosure. Mediating visual access, reducing glare, and creating filtered light environments are other architectural functions performed by assemblages of specialty glasses. Beveled glass, for example, is utilized for the interesting visual effects and optical distortions it provides and for its ability to bend light rays. It would be advantageous if these architectural functions could be performed by a monolithic sheet of glass.

The practice of creating an insulating glass assembly by enclosing a dead air space to act as an insulating barrier between two sheets of glass separated by a spacer is well known and widely used. The practical limits of the depth of the air space have been approximately ¾" because when the spacer is increased to 1" or more, a natural convection pattern occurs in the larger uniform space between the two sheets of glass with the cold air tending to circulate to the bottom of the insulating assembly. This natural convection creates condensation problems and an imbalanced susceptibility to cold transfer. It would be advantageous to be able to alter this natural convection pattern and increase the volume of air space without increasing the size of the spacer used to separate the two sheets of glass. A thinner glazing configuration can translate into advantages with respect to architectural design and lower frame cost.

Additionally, because of the relatively high conductivity of glass, glazed areas depend on the surface air films on both the inside and outside of the enclosed space to provide a large portion of the resistance to heat flow. An increase of the glass surface area, and an increase, therefore, of the amount of insulating air film for a given opening would be advantageous. Increased air space has been shown to have a positive effect on reducing sound transmission levels. Surfaces of varying depth or relief may exhibit a positive effect with regard to sound reduction when compared with planar surfaces of the same material. Additionally, it has become common practice to fill the air space between two sheets of glass with a gas, or mixture of gases, such as Argon and sulfurhexafluoride, to improve the thermal conductivity and acoustical performance of the insulating glass assemblies. It would add value to the practice of gas filling if additional volume could be provided within the limits of conventional glazing configurations. Increased interior volume is also of value for the inclusion of fire retardant gels and recently developed clear, porous gels with high insulating values such as aerogel.

There is a rather substantial body of prior art relating to the broad concept of placing a sheet of glass on some sort of supporting material and softening the glass to a desired form. However, the present invention yields an accumulation of distinctive features and fulfills desired objectives not evident in prior patents.

U.S. Pat. No. 4,186,723 (Coppola et al. 1980) discloses a glass sheet arcuately contoured in the form of a plurality of sinusoidal corrugations. The sinusoidal corrugations differ in form from the present invention, and are placed in a plane that is spaced well apart from the plane of the peripheral support lip, thereby yielding a much different effect on internal convection currents than is the object of the present invention. Additionally, the extreme extension from the plane of the peripheral support flange is a limitation on the range of practical applications. Furthermore, the mold assembly method taught herein yields different optical effects and lends itself to a greater variety of forms and applications than can be derived from the disclosures of the aforementioned patent.

U.S. Pat. No. 4,210,435 teaches a method for impressing an accent line into a glass sheet. Such a procedure does not pertain to the production of an overall low relief structured glass sheet as disclosed by the present invention since the creation of functional concavities and sculptural forms is basically different from simply making an impression in the glass surface.

SUMMARY OF THE INVENTION

This invention is an improved insulating glass assembly incorporating as one or both external glass sheets a structured glass sheet which has an articulated low relief surface comprised of a plurality of external convex curvatures and a corresponding plurality of internal concavities, defined and separated by a plurality of imparted graphic lines and a corresponding plurality of retaining ridges. Unique optical effects are intrinsic to the structured glass sheet. The invention includes the mold apparatus for manufacturing structured glass sheets for said insulating glass assemblies.

The broad method of manufacture whereby a sheet of glass is placed on some sort of supporting material and heated to cause the glass to sag onto or into the support material is, of itself, old. However, the object of the mold apparatus disclosed herein, henceforth referred to as an Edge Mold, is to impart a structure or a formation to a given sheet of glass which creates a novel type of articulated glass surface which has new and useful functional attributes; distinctive aesthetic qualities; dynamic light filtering capabilities; and optical effects produced within the structured glass sheet. The unique combination of attributes provided by this invention is not available in any other form of architectural grade glass. The Edge Mold is the direct cause of the coalescence of functional properties and aesthetic qualities produced in the structured glass sheet and therefore mold apparatus and article of manufacture are included here together because of their interdependence and to provide the most complete teaching of the invention.

It is an object of this invention to provide a means for increasing the volume of insulating air space within an insulating glass assembly while maintaining a thin glazing profile, thereby adapting to current architectural conventions and improving thermal performance.

It is an object of this invention to provide a means to alter or obviate the deleterious pattern of air convection associated with large uniform air volumes in conventional insulating glass assemblies, thereby overcoming condensation problems, thus allowing the incorporation of greater air volumes and improving thermal performance.

It is an object of this invention to provide an aid for reducing sound transmission levels in glazed architectural components, thereby improving acoustical performance.

It is an object of this invention to provide a means for improved control of daylighting, glare, and visual access in architectural environments.

It is an object of this invention to provide a novel glass structure which has the capability to act as a dynamic light filter, bending light rays and creating an interesting play of light in interior architectural spaces.

It is an object of this invention to provide a novel glass structure which includes bands of optical distortion extending outward from imparted graphic lines, creating a lively quality in the glass with the potential for viewer involvement in a kinetic relationship with the glass surface and the environment beyond.

It is an object of this invention to provide a novel glass surface which brings into being new graphic, textural, and sculptural qualities for use in architectural applications.

It is an object of this invention to be economically manufactured and compatible with current building practices and environments.

Further objects, advantages, and ramifications of this invention will become apparent from a consideration of the ensuing description.

BRIEF DESCRIPTION OF THE DRAWINGS

FIG. 1 is a perspective of the insulating glass assembly where the first surface is a sheet of low relief structured glass and the second surface is a flat sheet of glass.

FIG. 2 shows a plan view of the structured glass sheet in the assembly above.

FIG. 3 shows a section through the structured glass sheet taken along line 3—3 of FIG. 2.

FIG. 4 is a representation of a single convex node in the structured glass sheet showing the region of the bands of optical distortion extending outward from the imparted graphic line, and a typical application of sand etching for visual control and emphasis of the kinetic activity in the bands of optical distortion.

DESCRIPTION OF THE PREFERRED EMBODIMENT

Figure 5:
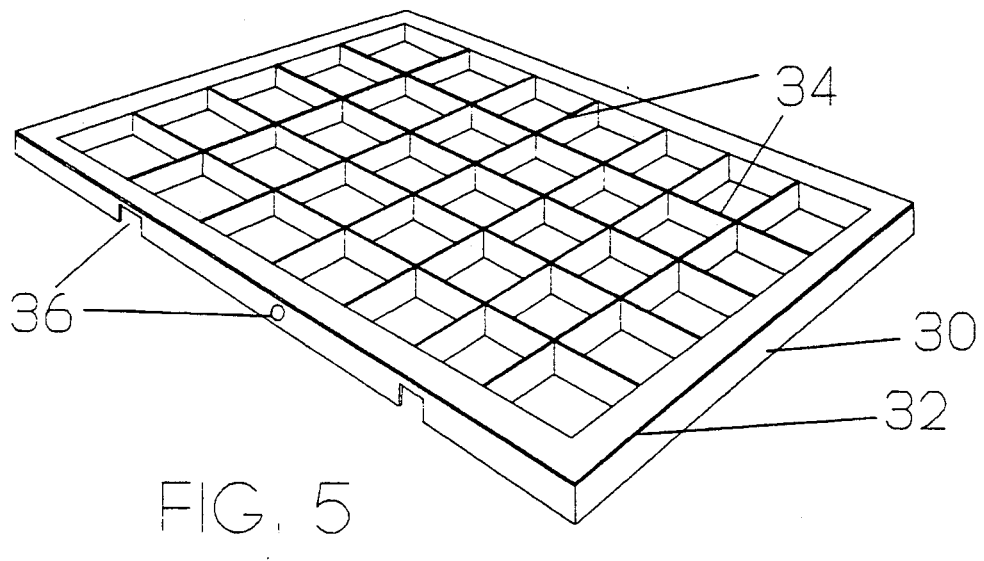
FIG. 5 is a perspective of a mold assembly employed in the manufacture of a structured glass sheet.

Referring to FIG. 5, a glass forming mold apparatus, hereinafter referred to as an Edge Mold, is shown. An Edge Mold is an open structure comprised of an array of upstanding edge members 34 surrounded by a perimeter support frame 30 with a flat contour rim 32 attached to the top of the support frame. These elements are aligned in a substantially horizontal plane. The support frame 30 may incorporate slots, bolts, brackets, or other means for receiving the upright edge members 34. Apertures 36 may be provided in the support frame 30 to assist in visual monitoring of the degree of distension of the glass sheet by an operator, or monitoring by a sensor.

Figure 6:
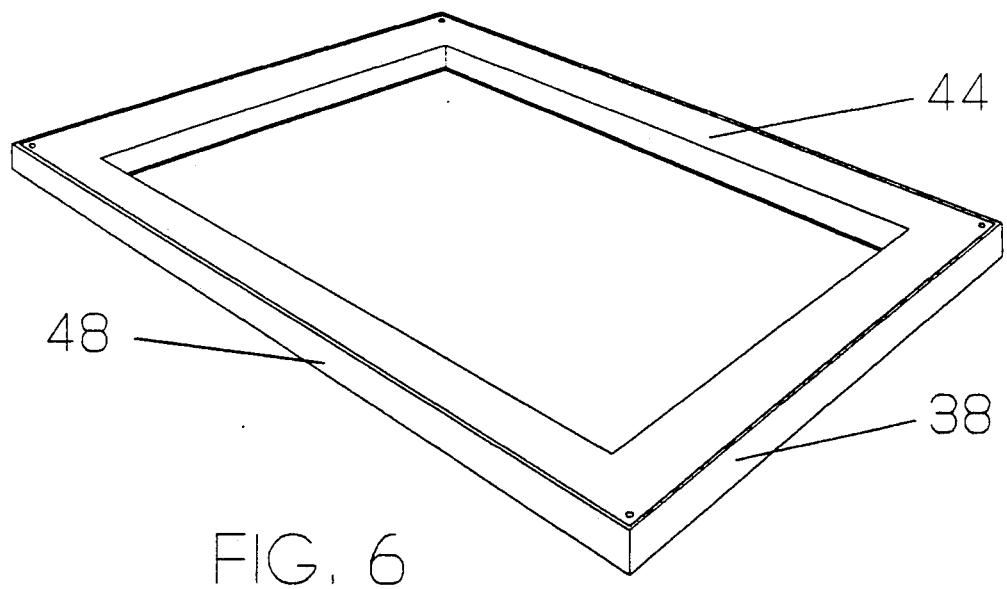
FIG. 6 is a perspective of an open frame base mold support bed.
Figure 9:
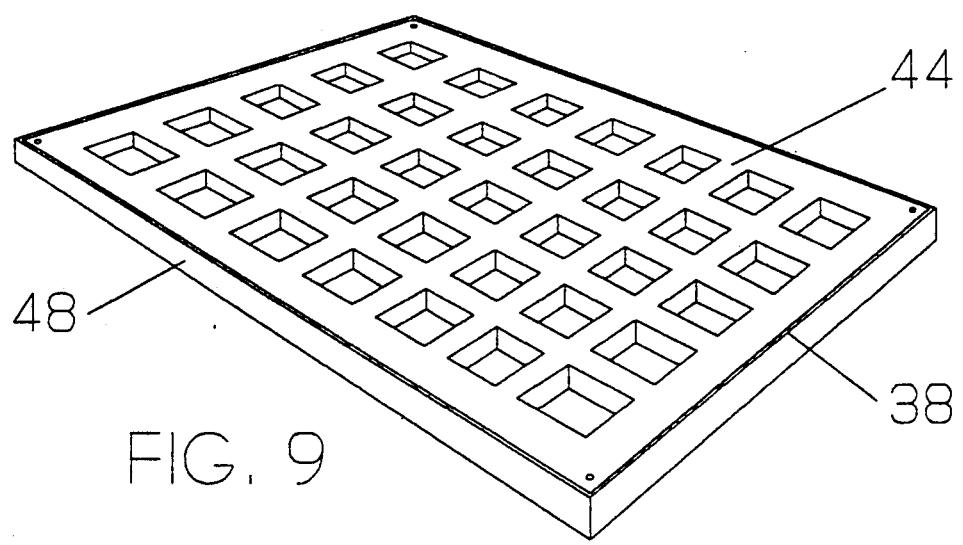
FIG. 9 is a perspective of an alternate base mold support bed.

The Edge Mold may have a base mold support bed 38 component which serves as a supporting substructure for the primary mold assembly, as an aid for automated conveyance by a rigid frame carriage assembly or by rollers, and as a means for increased elevation over a roller surface. In cases where the array of edge members 34 is not continuously joined, but rather independently arranged according to design, the base mold support bed 38 serves as a device to allow the edge member elements to be held in alignment, most often with stay pins or high temperature adhesive. The base mold support bed 38 is most often an open structure, either in a perimeter frame form as shown in FIG. 6, or in an integrated open form that may mirror the arrangement of upstanding edge members as shown in FIG. 9. The openings facilitate the quick dissipation of heat when the desired distension of the glass is achieved. A restraint rim may be placed on the glass in alignment with the flat contour rim 32 component when needed.

The components of the Edge Mold are made of heat resistant metal, ceramic, compressed ceramic fiber, refractory composite, or a combination of these. The top contact edges of the upstanding edge members 34 shown in FIG. 5 are the thickness of a flat sheet of refractory material sheared into strips, filed smooth, and arranged in a manner where the flat surface is perpendicular to the plane of the glass. A thickness of between 2 mm and 3 mm produces good results. The essential requirements are minimal mold material contact between the glass and the top contact edge of the vertical edge member 34, and an open structure which allows the glass to stretch freely. Pyramidal ceramic forms or other arrangements which satisfy these requirement may be used. The base mold support bed 38 is most often composed of a perforated ceramic fiber board 44 within a heat resistant metal alloy frame 48, as is illustrated in FIG. 9. The metal alloy frame 48 forms the contact surface for engaging a roller drive conveyor. In the case of conveyance by a rigid frame carriage assembly, the metal frame 48 can incorporate brackets with provisions for quick attachment to the carriage assembly. The edge members 34, the perimeter support frame 30, the flat contour rim 32, and the base mold support bed 38 may be assembled by any manner of joint and method of attachment, permanent or demountable, fixed or adjustable, appropriate to the design, manufacturing objectives, and to the type of refractory materials employed.

The edge members 34 form an open structure for the glass to stretch into under the influence of heat and gravity. Referring to FIG. 4, the action of the glass stretching over the thin edge member creates the surprising result of a relatively consistent band width of optical distortion 26 extending in a zone parallel to the graphic line 24 imparted by the edge member 34. Minimal mold contact preserves the clarity of the glass and the open structure facilitates gas quench tempering or, alternatively, heat strengthening and annealing. The preferred retaining ridges 18 are formed when the top contact edges of the thin edge members 34 are aligned with each other and substantially in the same plane with the surrounding flat contour rim 32.

Figure 7:
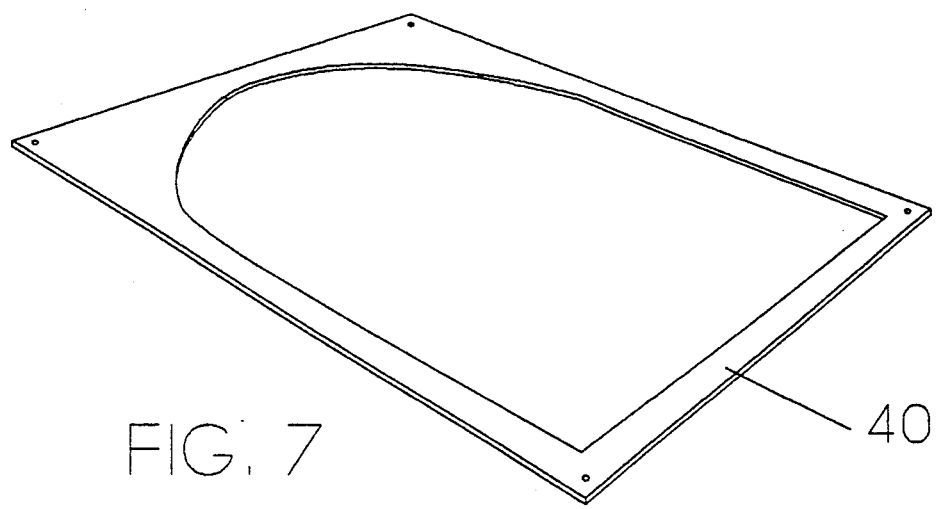
FIG. 7 is a perspective of a horizontal flat plate overlay element used to alter the contour of a given mold assembly.
Figure 8:
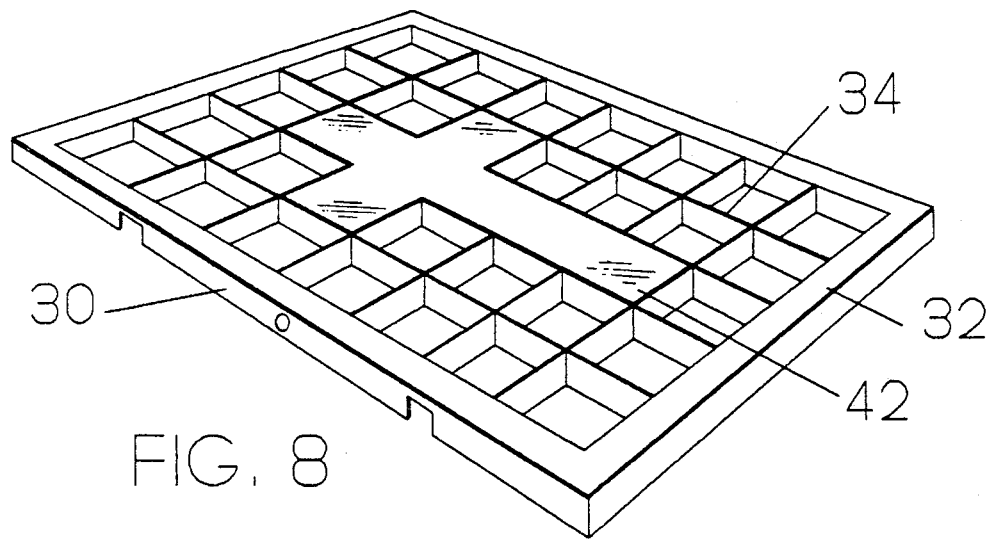
FIG. 8 is a perspective of the mold apparatus which shows the inclusion of a horizontal flat plate insert element.

This glass forming mold apparatus for the production of low relief structured glass sheets is intended to encompass all combinations of curved and straight edge members 34 which may be required to produce a specific low relief patterned or figured formation of glass concavo-convexities. Also anticipated are various thicknesses or contact widths of the vertical edge members and combinations of these varieties. This invention extends to the inclusion of other elements set within or upon the edge mold assembly, in particular, elements set perpendicular to the edge members in the horizontal plane, which may be required to keep selected areas of the structured glass sheet relatively flat in relation to the network of convex curvatures 20. Referring to FIG. 7, a horizontal flat plate overlay element 40 of thin sheet refractory can be placed upon the Edge Mold to alter the contour of the flat perimeter lip. This example illustrates an economical means of creating a round top glass panel from a rectangular Edge Mold. A horizontal flat plate insert element 42 is shown in FIG. 8 to further elucidate the concept of selectively retaining portions of the glass sheet in a substantially flat plane.

One of the positive aspects of this invention is that it is readily adaptable to well known manufacturing practices for conventional bent glass. An Edge Mold may be made to be conveyed on rollers or to be transported by a rigid frame carriage assembly. A sheet of glass is positioned on the Edge Mold and conveyed on a horizontal path through a furnace apparatus where the glass is gradually heated to a softening state, around 1300 degrees F. The glass is allowed to stretch into the Edge Mold under the forces of gravity, temperature, and time. When the desired distension of the material is achieved, the glass is quickly moved into a gas quench station. Tempering is optional. Another alternative is to quickly move the glass into an annealing zone, or lehr, re-anneal the glass, and cool gradually. Other manufacturing enhancements, such as atmospheric pressure differentials in the forming zone, or employing a vertical lift or drop of the mold assembly as the glass is softening, may be used to speed the process. It should be noted that the Edge Mold forming apparatus can also produce structured glass sheets in a single stationary furnace.

The strength of the structured glass sheet may be increased considerably by an ion exchange treatment with soluble salts, most notably Tripotassium Phosphate, as is done in well known practice. This soluble salt treatment, known as chemical tempering, may be done on line using a spray method or may be accomplished as a separate step after the forming process is complete.

A sheet of glass may also be chemically tempered prior to the forming process.

Referring to FIGS. 1-3, an embodiment of the low relief structured glass insulating assembly is shown in its simplest form. In this embodiment, the low relief structured glass sheet 10 is one surface of the fabricated insulating glass assembly. The second surface 14 may be either a flat sheet of glass or another structured glass sheet. The two sheets of glass are assembled according to current practice, that is, separated by a spacer element 12 which may contain a desiccant in some form, and a perimeter sealant. A continuous flat lip 16 is provided around the perimeter of the structured glass sheet 10. The convex curvatures 20 form a contiguous array, separated and defined at their perimeters by the graphic lines 24 imparted by the edge members 34. The low relief sculptural character of the convex curvatures 20, whether geometric, tubular, abstractly figured or regularly patterned, is determined by the relative placement of the edge members 34 and the overall design. The distension of the convex surfaces varies according to the particular design, most often, but not limited to, within 2½" of the perimeter lip 16.

Reciprocally related to the imparted graphic lines are the retaining ridges 18. The retaining ridges 18 are aligned in a substantially planar array at a distance of not more than ¾", most often ½" or less, from the opposing surface. The retaining ridges 18 define the boundaries of the internal concavities 22, forming compartmentalized pockets of insulating air space, thereby obviating the deleterious pattern of convection associated with large uniform air spaces in conventional insulating glass assemblies which employ wider spacers to increase air volume.

Referring to FIG. 4, the glass stretching process generates relatively consistent bands of optical distortion 26 extending outward from the imparted graphic lines 24. This visually kinetic zone creates a lively quality within the glass and affects transmitted light rays, creating surprising patterns of rippled light in sunlit environments. When the sheet of glass is pretreated by selectively abrasive etching the surface, the abraded areas 28 soften and flow during the thermal forming process, resulting in a reintegrated surface which exhibits translucent properties, useful in controlling light, glare, and visual access. Most often, the glass surface is selectively etched in areas whose contour parallels the imparted graphic lines 24 in a manner so as to make distinct the bands of optical distortion 26 and remove clarity of vision as an attribute of the glass sheet. Abrasive sand etching is the preferred method but corrosive etching methods may also be employed.

An articulated low relief structured glass sheet may be further treated by the application or deposition of various coatings, such as low emissivity coatings or such thin film metallic coatings as are used to obtain specified performance objectives or aesthetic effects. This includes coatings applied to create mirrors. As a further treatment, the structured glass sheets themselves may be bent into longitudinal curves on conventional curved forms according to well known manufacturing practices for architectural bent glass.

It is readily apparent that this invention provides a significant increase in interior volume and surface area for a given opening, two significant elements affecting thermal performance. These elements will vary quantitatively according to the particular design employed. The sum of the volumes of the compartmentalized interior concavities 22 of a structured glass sheet 10 can provide additional air space equivalent to a complete insulating unit of the same perimeter with a ⅛" to ¼" spacer. In other words, a low relief structured glass insulating assembly with a ¼" spacer may provide the interior volume equivalent to a comparable unit made with a 1" spacer. This increased air space can also improve sound control performance. Additionally, because of the relatively high conductivity of glass, glazed areas depend on the surface air films on both the inside and outside surfaces of the enclosed space to provide a large portion of the resistance to heat flow. This invention can increase the glass surface area for a given opening, and therefore the amount of insulating air film, as much as 22% per glass sheet, depending on the particular design employed. Furthermore, any exterior surface air film is subject to dissipation by wind. This invention provides a deeply textured surface which may prove to be more resistant to skin layer dissipation.

Additionally, materials with high insulation values are available to be placed in the air space between two panels of glass. Among these is aerogel, a material with an insulating value of approximately R-20 per inch. The structure of aerogel is composed of particles of pure silica hooked together to form cavities only a few nanometers in diameter. These tiny holes trap and isolate air molecules, preventing them from transferring thermal energy to other molecules. Because the pores are much smaller than visible light waves, aerogel is clear in appearance, a material that is both transparent and porous. The invention disclosed herein could incorporate aerogel to provide a window/wall component which would have insulation values competitive with most current solid wall systems while providing additional energy gains associated with daylighting and passive solar construction.

SUMMARY, RAMIFICATIONS, AND SCOPE

In current practice, thermal performance in insulating glass assemblies has been improved by various coatings, most notably low emissivity coatings; by the use of various glass formulations to alter absorption, shading, and transmittance properties; by gas filling; and by the use of multiple glazed assemblies, i.e. triple glazed insulating units. This invention is readily compatible with all of these approaches and can add to the thermal performance gains associated with these existing techniques.

Accordingly, the reader will see that low relief structured glass can be simply manufactured and has the capacity to make both functional and aesthetic contributions to our architectural environment. Insulating glass assemblies fabricated with an external panel of structured glass can incorporate and improve upon recent advances in glass compositions and surface coating technology. Acoustical performance can be enhanced. The practicality of increased volume within existing thin glazing configurations is a complement to the research and development of materials with high insulation values that can be placed in the void between two panels of glass. Beyond the societal benefits of energy savings through improved handling of daylight and thermal performance, the aesthetic attributes of low relief structured glass offer quality of life benefits. Division of glazed areas into smaller units provides human scale and increases the protective and comforting sense of enclosure. Mediating visual access, reducing glare, and creating filtered light environments are other architectural functions performed by this invention. The play of light on and through sculptural glass forms and the kinetic visual engagement afforded by the optical characteristics of this unique glass structure offer the experience of delight, a welcome and needed quality in our modern built environment.

Although the invention has been described in its preferred form with a certain degree of particularity, it is understood that the present disclosure is to serve as an example only. Numerous changes in the combination and arrangement of parts may be resorted to without departing from the spirit and scope of the invention. Indeed, one of the positive attributes of this invention is that it has so much potential for variety in design and application. However, it is intended that the scope of the invention should be determined by the suitable expression of the appended claims and their legal equivalents.

I claim:

1. A low relief structured glass sheet having two faces, comprising, in combination, a plurality of convex curvatures, a plurality of imparted graphic lines defining the perimeter of said convex curvatures, a plurality of concavities reciprocally related to said convex curvatures, a plurality of retaining ridges being reciprocally related to said imparted graphic lines and defining the perimeters of said concavities, highly compressive glass surfaces resulting from a strengthening treatment whereby structural compressive curvatures are formed, a plurality of areas of optical distortion, extending in approximate bands away from said graphic lines, and a flat perimeter lip, said retaining ridges being in a substantially planar alignment with each other and with said perimeter lip.

2. A low relief structured glass sheet as described in claim 1 wherein the strengthening treatment is a process of ion exchange.

3. A low relief structured glass sheet as described in claim 1, said glass sheet having a state of tension between the two faces which is a compensating force for said highly compressive glass surfaces.

4. A low relief structured glass sheet as described in claim 1 wherein the retaining ridges form a rectangular array.

5. A low relief structured glass sheet as described in claim 1 wherein the retaining ridges are disposed in a parallel array.

6. A low relief structured glass sheet as described in claim 1 wherein the retaining ridges are curvilinear.

7. An improved insulating glass assembly wherein two sheets of glass are held apart by a spacer element and sealed with a sealing element to create an insulating air space therebetween, wherein the improvement includes an external low relief structured glass sheet comprising, in combination, a plurality of external convex curvatures, a plurality of imparted graphic lines defining the perimeter of said convex curvatures, a plurality of areas of optical distortion, extending in approximate bands away from said graphic lines, a plurality of interior concavities reciprocally related to said convex curvatures, highly compressive glass surfaces resulting from a strengthening treatment, a plurality of retaining ridges being reciprocally related to said imparted graphic lines and defining the perimeters of said concavities, and a flat perimeter lip, said retaining ridges being in a substantially planar alignment with one another and with said perimeter lip, whereby increased air space is held within compartmentalized concavities formed by said retaining ridges in a manner which restricts internal convection currents within the insulating glass assembly.

8. An improved insulating glass assembly as described in claim 7 wherein both external faces of said assembly are low relief structure glass sheets, each including, in combination, a plurality of external convex curvatures, a plurality of imparted graphic lines defining the perimeter of said convex curvatures, a plurality of internal concavities reciprocally related to said external convex curvatures, highly compressive glass surfaces resulting from a strengthening treatment, a plurality of retaining ridges being reciprocally related to said imparted graphic lines and defining the perimeters of said concavities, and a flat perimeter lip, said retaining ridges being in substantially planar alignment with one another and with said perimeter lip.

9. An improved insulating glass assembly as described in claim 7 further including means to decrease thermal conductivity placed in the insulating air space between the two panels of glass.

10. An improved insulating glass assembly as described in claim 7 further including the material aerogel placed in the insulating air space between the two panels of glass.

* * * * *